D. MURPHY.
CLOSING MEANS FOR JARS.
APPLICATION FILED OCT. 12, 1915.
1,292,356.
Patented Jan. 21, 1919.
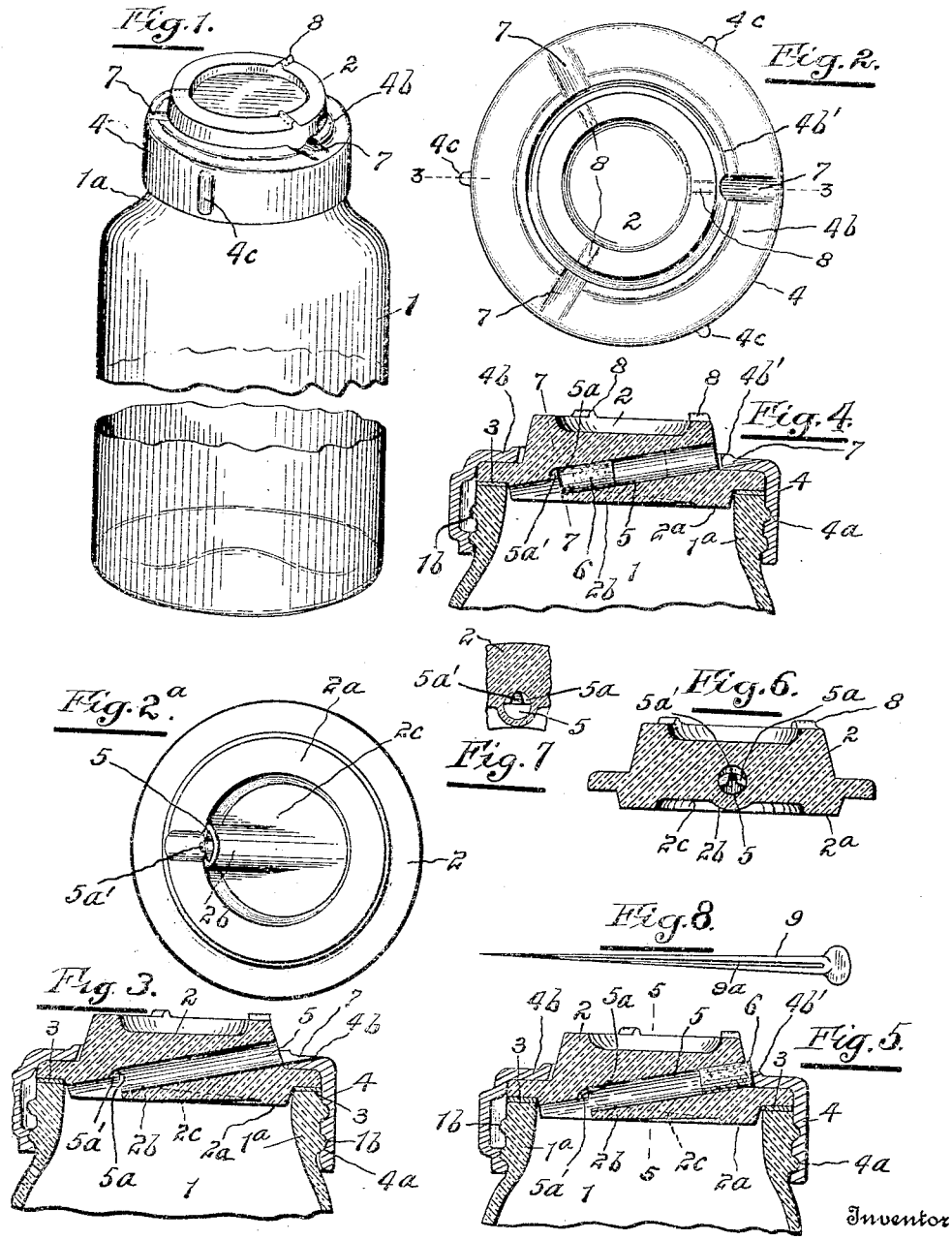

UNITED STATES PATENT OFFICE.

DAVID MURPHY, OF CLEVELAND, OHIO.

CLOSING MEANS FOR JARS.

1,292,356.  Specification of Letters Patent.  Patented Jan. 21, 1919.

Application filed October 12, 1915. Serial No. 55,419.

*To all whom it may concern:*

Be it known that I, DAVID MURPHY, a citizen of the United States, residing at Cleveland, in the county of Cuyahoga and State of Ohio, have invented certain new and useful Improvements in and Relating to Closing Means for Jars, of which the following is a specification.

This invention relates to a jar or receptacle used for canning, preserving and pickling fruit and other materials; more particularly the invention relates to the closing means for the jar or receptacle.

One object of the invention is to provide improved closing means which permit the jar to be filled with food or fruit substantially to the top of the jar and the closing thereof without any confined air.

Another object of the invention is to provide improved jar closing means including a cap which is formed with an opening and constructed and arranged to permit air and bubbles within the jar to rise upward and escape through the opening.

Another object of the invention consists in providing improved closing means one element of which is movable to permit expansion and contraction of the food, fruit, air or gases within the jar.

Another object of the invention is to provide improved means for closing the jar which permit the expansion and contraction of the food, fruit, air or gases within the jar, without undue strains upon the walls of the jar or jar neck.

A further object of the invention is to provide closing means for a jar of simple construction and capable of permitting the opening of the jar in an easy manner and without undue physical exertion or strain on the walls of the jar or jar neck.

With these and other objects in view, the invention consists of the parts and combination of parts hereinafter described.

For the purpose of illustration, I have, in the accompanying drawings, shown and herein described one form of construction embodying my invention.

Figure 1 is a perspective view of a jar or receptacle having closing means embodying my invention.

Fig. 2 is a top plan view of the closing means, the parts of which are in position to permit the insertion of the sealing element.

Fig. 2ª is a bottom plan view of the cap.

Fig. 3 is a transverse section through the jar neck, and the closing means for the jar on line 3—3 of Fig. 2.

Fig. 4 is a view similar to Fig. 3 showing the sealing element in the runway of the cap and in the position it may sometimes occupy.

Fig. 5 is a transverse sectional view showing the position of the parts after the jar is closed and the sealing element has been actuated to the end of its extreme outward movement by the expansion of the food, fruit or gases formed within the jar.

Fig. 6 is a section on the line 5—5 of Fig. 5.

Fig. 7 is a fragmentary view on the line 7—7 of Fig. 4.

Fig. 8 is a view of the tool used for opening the jar.

In the drawings, 1 indicates a jar or receptacle which may be of any desired shape and size and formed from any suitable material such as glass. The jar has a neck 1ª on which are preferably provided screw threads 1ᵇ.

2 indicates a cap preferably formed from glass or porcelain. The cap 2 may be of the same diameter as the jar neck 1ª and adapted to engage with or rest upon the upper edge thereof. The lower face of the cap 2 is preferably provided with an annular rib 2ª which is concentric to the center of the cap and engages with the inner walls of the jar neck 1ª, thereby insuring at all times proper positioning of the cap 2. 3 indicates a washer, which may be formed of paper or other suitable material, interposed between the cap 2 and upper or free edge of the jar neck 1ª. This washer serves to form an air and liquid tight joint between the cap 2 and neck 1ª in a well known manner when the cap 2 is fixed in position. The cap 2 may be clamped on the jar neck by a clamping device 4.

The clamping device 4 is of annular shape and formed with screw threads 4ª which engage with the screw threads 1ᵇ on the jar neck 1ª. The member 4 is provided at its upper edge with an inwardly extending flange 4ᵇ which overlies the circumferential edge of the cap 2. The free or circumferential edge of the flange 4ᵇ serves as a stop 4ᵇ′, for a purpose to be later described. such edge being preferably thickened and inclined as shown in the drawings. The clamping member 4 is adapted to be screwed on the neck 1ª in a well known way, and when it is so positioned, it serves to tightly secure the cap 2 to the uper edge of the neck 1ª. The member 4 is preferably provided with one or more projections 4ᶜ which may be engaged by a suitable tool to clamp or unclamp the member 4 in an easy manner.

5 indicates an opening formed in and through the cap and arranged to receive a sealing device 6. The outer end of the opening 5 terminates upon the upper side of the cap and the inner end of the opening terminates on the under side thereof, as will be clearly understood from the drawing, the cap 2 having an integral curved, depending portion 2ᵇ which forms part of the wall for the opening 5. The opening 5 is preferably inclined to provide a relatively long opening, so that the sealing device 6 can have maximum movement therein, as will be later described. The opening 5 is preferably straight from end to end so that a long pin, rod or wire can be inserted therein for purposes which will be later set forth. Near its inner end the wall of the opening 5 is offset on its upper side to form a stop or shoulder 5ª.

The lower surface of the cap 2 is inclined from one side (that side opposite the inner end of the runway 5) upwardly, as shown at 2ᶜ, so that the air and bubbles within the jar, after it is filled, may rise upwardly and eventually enter the inner end of the opening 5, which also being inclined upwardly permits the escape thereof. To insure the rising of the bubbles and their movement around the inner end walls of the opening 5, I preferably cut away the wall of the stop 5ª, as shown at 5ª′ to form a chamber or cavity above the highest portion of the inclined walls 2ᶜ into which the bubbles may rise before flowing into the passage 5.

The device 6 preferably comprises a section or piece of cylindrical material, such as cork, adapted to tightly fit within the opening 5. The device 6 is movable axially of the opening 5 under certain conditions, which will be later set forth, due to the expansion and contraction of the food, fruit, air or gases within the jar; when the sealing device 6 moves to the outer end of the opening 5 it engages the stop 4ᵇ′ which prevents further movement thereof outwardly, the opening 5 and stop 4ᵇ′ being disposed and correlated to provide for this operation, and when the sealing device 6 is drawn inwardly it engages with and is stopped by the shoulder 5ª.

7 indicates one or more slots or grooves which are formed in the flange 4ᵇ of the clamping member 4. Before the clamping member 4 is screwed down tight, it can be moved to bring one of the slots or grooves 7 into registry with the opening 5, as shown in Fig. 3, whereupon a sealing device 6 can be inserted therein.

8 indicates one or more devices carried by the upper edge of the cap 2. It is adapted to be engaged by the tool which may be constructed to cause, by the act of screwing on the clamp member 4, automatic alinement of the runway 5 and a slot 7. Under such circumstances, the cap 2 and clamp 4 will be rotated together until the clamp 4 is capable of but slight additional movement relative to the cap 2 to clamp the latter sufficiently tight for storing.

In operation, the jar is filled with the previously prepared or unprepared fruit or other material substantially to the top of the jar 1; then the cap 2 is placed on the jar neck 1ª and the clamping member 4 screwed down part way and positioned to bring one of the grooves or slots 7 into registry with the opening 5. By tilting the jar 1 to position the opening 5 vertically, in which event a funnel or pitcher can be used, or by using a filling device, additional material can be placed in the jar until it and substantially the entire space within the opening 5 is completely filled; or, if desired, the jar 1 may be entirely filled after the cap 2 and clamping member 4 have been placed in position.

The filling of the jar to this point is possible because the material may be inserted after the cap 2 and clamping member 4 are placed in position. Any air or bubbles within the jar rise to the cap where they are guided upwardly into the cavity 5ª′ and then flow through the runway 5 and escape from the outer end thereof.

When the jar 1 has been entirely filled, as just described, the sealing device 6 is inserted in the outer end of the opening 5, thereby sealing the jar. If the material is bottled in a hot state, I prefer to position the sealing device 6 at or near the outer end of the opening; but if the material is bottled in a cold condition, I then prefer to position the sealing device near the inner end of the opening.

My invention serves to compensate for the expansion and contraction of the jar contents and thus avoids undue pressure on the jar walls either internally or externally. I accomplish these results by providing a long opening or guide way in which the sealing device 6 moves automatically accordingly as the pressure within the jar becomes greater or less than that of the atmosphere. After the jar is completely filled, the movable device 6, due to the expansion of the jar contents, air and gases, will move outwardly until it is stopped by the stop 4ᵇ′, as shown in Fig. 5. When the expansion ceases and a vacuum is set up within the jar, the device 6 will be sucked or drawn inwardly, such movement being limited by the stop 5ª, and preventing undue pressure on the exterior walls of the jar by the atmosphere. The device 6 is of a size to fit tightly within the opening 5 to make the jar both air and liquid tight, but at the same time it is capable of moving from end to end of the opening 5 under influence of the forces within the jar.

From the foregoing description it will be seen that the device 6 operates automatically under the influence of, and serves to compensate for, the different degrees of pressure within the jar, thus preventing entirely, or substantially entirely, strains upon the walls of the jar 1 at all times, at the same time serving to seal the jar in an air tight manner. As the sealing device moves inwardly under the influence of the vacuum created within the jar, only a low or partial vacuum is created within the jar. It will also be understood from the foregoing description that the sealing device 6 is always in contact with the material in the jar; it cannot therefore shrink and be blown out on the one hand or on the other permit outside air to enter the jar.

The curved integral wall $2^b$ of the cap 2 extends to a point opposite the stop $5^a$ so that the forces, due to expansion and fermentation within the jar, will always act on the end of the movable device 6 in a direction axially of the opening 5 and not upwardly.

The jar may be opened by first unscrewing the clamping member 4, only sufficient force being required to overcome the mechanical friction between this member and the walls of the jar, and then removing the cap 2. In the event the contents of the jar have expanded for any reason, I prefer to first use a pin 9 having a groove $9^a$, such as illustrated in Fig. 6. This pin can be injected through the device 6 or inserted between it and the walls of the opening 5. Such operation will permit the air or gases within the jar to escape, and thus permit the jar to be opened in an easy manner and without exerting any undue physical effort. In the event it is found that a vacuum exists within the jar, the pin 9 can be used in the same manner to permit air to fill the jar and thus equalize the tension within and without the jar, whereby the cap can be easily removed.

All the parts constituting the closing and sealing devices are preferably formed of materials which do not affect in any way the materials placed within the jar on the one hand or on the other corrode by contact with such materials.

From the foregoing description it will be seen that my invention lends itself for use in preserving materials where the latter are first filled in the jar in an unprepared or cold condition and afterward cooked. Under such circumstances, the sealing device is placed at the inner end of the runway against the stop $5^a$ so that it may permit of maximum expansion within the jar. If found necessary, the pin 9 can be inserted temporarily between the sealing device and the wall of the opening 5 to permit the escape of steam, the elasticity of the cork permitting this operation and without making a permanent opening between the cork and the cap.

To those skilled in the art of making devices of the class described, many alterations in construction and widely differing embodiments and applications of my invention will suggest themselves, without departing from the spirit and scope thereof. My disclosures and the description herein are purely illustrative and are not intended to be in any sense limiting.

In the preferred form of construction the stop $4^{b'}$ is arranged to expose or leave unobstructed a portion of the outer end of the opening 5, so that in the event fermentation takes place at any time within the jar, the pin 9, or equivalent device, can be easily inserted through the opening 5 at one side of the sealing device 6 to form a temporary vent for the gases of fermentation without opening the jar and reboiling its contents.

What I claim is:

1. The combination with a jar, of means for closing the jar comprising a cap having an opening therethrough and a device for closing and sealing said opening, said device being slidably mounted in and movable endwise in said opening and actuated by the pressure within the jar due to expansion or contraction of the jar contents without breaking the seal.

2. The combination with a jar, of means for sealing said jar including a slidable device, one end of said device being exposed to the space within the jar and the other end of said device being exposed to the atmosphere, whereby it is free to be actuated in opposite directions by the pressure within said jar due to the expansion and contraction of the jar contents without breaking the seal.

3. The combination with a jar, of a cap, formed with an opening therethrough, for closing the said jar, said opening having the same diameter from end to end, and a device mounted within and sealing said opening but movable endwise therein due to pressure within the jar without affecting the seal.

4. The combination with a jar, of a cap, formed with an opening therethrough, for closing the said jar, said opening having the same diameter from end to end, a device mounted within and sealing said opening but movable endwise therein due to pressure within the jar without affecting the seal, and means arranged at or adjacent the inner end of the opening for preventing movement of said sealing device therebeyond.

5. The combination with a jar, of a cap having a wall for engagement with the walls of the opening to said jar and a central body portion which extends above and below said wall, the central body portion of said cap being formed with an opening extending in an inclined direction relative to the plane of said wall, whereby the outer end of the opening terminates on the outer side of said cap and the inner end of the opening terminates on the under side of said cap, said opening having the same diameter from end to end, and a device mounted within and sealing said opening but movable endwise therein due to pressure within the jar without affecting the seal.

6. The combination with a jar, of means for sealing said jar including a movable device actuated in opposite directions by the pressure within said jar due to the expansion and contraction of the jar contents, and means for limiting the movement of said device in either direction.

7. The combination with a jar, of means for sealing said jar comprising a cap formed with an opening which extends through it from its lower side to its upper side, and a device mounted in the opening for sealing it, said device being of less length than the opening and movable endwise in opposite directions from end to end thereof.

8. The combination with a jar, of means for closing said jar comprising a cap formed with an opening which extends through it from its under side to its upper side, said opening permitting the escape of air from the interior of the jar, a device for sealing the opening, and a depending wall formed on the lower side of said cap and arranged adjacent to the inner end of said opening.

9. The combination with a jar, of means for closing the jar including a cap formed with an opening extending therethrough from its lower side to its upper side, and a device, formed from compressible material, slidably mounted in and sealing said opening, said device being of less length than the length of said opening and movable in opposite directions therein due to expansion or contraction of the jar contents without breaking the seal.

10. The combination with a jar, of means for sealing said jar comprising a cap formed with an opening through it and a device for sealing said opening, said device being of less length than the length of said opening and movable endwise therein by the pressure within the jar due to expansion or contraction of the jar contents, and means arranged in the plane in which the inner end walls of the opening terminate for limiting the movement of said sealing device inwardly therebeyond.

11. The combination with a jar, of means for sealing said jar comprising a cap formed with an opening through it and a device for sealing said opening, said device being movable endwise of the opening by the pressure within the jar due to expansion or contraction of the jar contents, and means arranged at the opposite ends of the opening for limiting the movement of said sealing device therebeyond.

12. The combination with a jar, of means for sealing said jar comprising a cap formed with an opening through it, a device for sealing said opening, and an annular member for clamping said cap to the jar and provided with a wall which serves as a stop for limiting the outward movement of said sealing device.

13. The combination with a jar, of means for sealing said jar comprising a cap formed with an opening through it, a device for sealing said opening, and means for clamping said cap to the jar and provided with a wall which serves as a stop for limiting the outward movement of said sealing device, said wall having a recess arranged to register with the opening in the cap to permit insertion of said sealing device.

14. The combination with a jar, of a cap for closing the open end of the jar, said cap being formed with an opening through it, a member provided with screw threads engaging screw threads on said jar and a flange engaging said cap to clamp it in position, and a device slidably mounted in the opening in said cap for sealing the jar, said opening being inclined so that the flange of said clamping member is disposed across the outer end of the opening and limits the outward movement of the sealing device.

15. A cap adapted to engage and close the open end of a jar or receptacle, formed with an opening to receive a sealing device and provided with a shoulder at or adjacent the inner end of said opening to limit the inward movement of the sealing device, the under surface of the cap being inclined from its periphery upwardly to the inner end of the opening.

16. A cap for the open end of a jar or receptacle, formed with an opening to receive a sealing device, a shoulder at the inner end of the opening to limit the inward movement of the sealing device, and a chamber beyond the shoulder to receive bubbles or air rising upwardly within the jar.

17. A cap adapted to engage and close the open end of a jar or receptacle, formed with an opening to receive a sealing device and a shoulder to limit the inward movement of the sealing device, and also a chamber beyond the shoulder to receive bubbles or air rising upwardly within the jar, the under surface of the cap being inclined from its periphery upwardly to the inner end of the opening.

18. A cap adapted to engage and close the open end of a jar or receptacle, formed with an inclined opening extending from the lower side to the upper side of the cap, the outer end of the opening being exposed when the cap is fitted to the jar and adapted to receive a sealing device, and the lower side of the cap being inclined downwardly from the inner end of the opening to the opposite edge of the cap, whereby air and bubbles within the jar will rise and enter said opening.

19. A cap adapted to engage and close the open end of a jar or receptacle, formed with an inclined opening extending from the lower side to the upper side of the cap and adapted to receive a sealing device, the lower side of the cap being inclined downwardly from the inner end of the opening to the opposite edge of the cap, whereby air and bubbles within the jar will rise and enter said opening, and a shoulder at or adjacent the inner end of the opening to limit the inward movement of the sealing device.

20. A cap adapted to engage and close the open end of a jar or receptacle, formed with an opening, which extends through the cap from its lower to its upper side, to receive a sealing device, and a chamber adjacent to and communicating with the inner end of the opening, the lower side of the cap being inclined downwardly from the chamber and the inner end of the opening to the periphery of the cap.

In testimony whereof I affix my signature, in the presence of two witnesses.

DAVID MURPHY.

Witnesses:
ANNA MURPHY,
M. MILLARD.

Copies of this patent may be obtained for five cents each, by addressing the "Commissioner of Patents, Washington, D. C."